United States Patent [19]

Frerking, Jr. et al.

[11] Patent Number: 5,178,702

[45] Date of Patent: Jan. 12, 1993

[54] PNEUMATIC TIRE HAVING A MULTILAYERED INNERLINER

[75] Inventors: Harlan W. Frerking, Jr., Alliance; Richard R. Smith, Cuyahoga Falls, both of Ohio

[73] Assignee: The Goodyear Tire & Rubber Company, Akron, Ohio

[21] Appl. No.: 680,656

[22] Filed: Apr. 4, 1991

[51] Int. Cl.$^5$ .............................................. B60C 5/14
[52] U.S. Cl. .............................. 152/510; 152/DIG. 16
[58] Field of Search .............. 152/510, 511, 504, 505, 152/506, DIG. 16

[56] References Cited

U.S. PATENT DOCUMENTS

| | | | |
|---|---|---|---|
| 2,489,995 | 11/1949 | Young | 152/347 |
| 2,541,550 | 2/1951 | Sarbach et al. | 154/139 |
| 2,575,249 | 11/1951 | Connell et al. | 154/139 |
| 2,676,636 | 4/1954 | Sarbach | 152/330 |
| 3,038,515 | 6/1962 | Koch et al. | 152/510 |
| 3,903,947 | 9/1975 | Emerson | 152/504 |
| 4,256,158 | 3/1981 | Chautard et al. | 152/330 RF |
| 4,388,261 | 6/1983 | Codispoti et al. | 152/505 X |
| 4,549,593 | 10/1985 | Yahagi et al. | |
| 4,857,409 | 8/1989 | Hazelton et al. | 428/494 |
| 5,005,625 | 4/1991 | Klemmensen et al. | 152/510 |

FOREIGN PATENT DOCUMENTS 0337279  10/1989  European Pat. Off. .
2198138  6/1988  United Kingdom .

OTHER PUBLICATIONS

R. J. Eldred, Dimensional Control Swelling in Nitrile Elastomers by Anisometric Fillers, Rubber World, vol. 188 (1983).
Eldred et al, Platy Filler Effects on Fracture Energies and Flex Fatigue of Elastomers, ACS Rubber Divison Fall 1989 Meeting.
R. J. Eldred, Effect of Oriented Platy Filler on the Fracture Mechanism of Elastomers, Rubber Chemistry and Technology, vol. 61, Sep.–Oct. 1988.

Primary Examiner—Geoffrey L. Knable
Attorney, Agent, or Firm—Bruce J. Hendricks

[57] ABSTRACT

The present invention relates to a pneumatic rubber tire having an integral innerliner characterized by a top layer and a rubber laminate having at least three additional layers. At least two of the three layers are barrier layers and comprise a sulfur cured rubber composition containing, based on 100 parts by weight of rubber, 100 parts of an acrylonitrile/diene copolymer rubber having an acrylonitrile content ranging from about 30 to about 45 percent and from about 25 to about 150 parts by weight of a platy filler selected from the group consisting of talc, clay, mica or mixtures thereof. The thickness of each acrylonitrile/diene barrier layer ranges from about 25 microns to 380 microns. Between the two layers of acrylonitrile/diene copolymer is at least one non-barrier layer of a sulfur cured rubber selected from the group consisting of natural rubber, halogenated butyl rubber, butyl rubber, cis-1,4-polyisoprene, styrene-butadiene rubber, cis-1,4-polybutadiene, styrene/isoprene/butadiene rubber or mixtures thereof. The laminate may contain from about 3 to 100 individual layers.

10 Claims, No Drawings

PNEUMATIC TIRE HAVING A MULTILAYERED INNERLINER

BACKGROUND OF THE INVENTION

The inner surface of a pneumatic tire is typically comprised of an elastomeric composition designed to prevent or retard the permeation of air and moisture into the carcass from the tire's inner air chamber. It is often referred to as an innerliner. Innerliners have also been used for many years in tubeless pneumatic vehicle tires to retard or prevent the escape of air used to inflate the tire, thereby maintaining tire pressure. Rubbers, such as butyl and halobutyl rubber, which are relatively impermeable to air are often used as a major proportion of the innerliners.

The innerliner is normally prepared by conventional calendering or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

Halobutyl rubber is generally the most expensive rubber used in a tire. Given the competitive tire market and the continued need to lower the cost of manufacturing tires without sacrificing properties, there exists a need to eliminate or substantially decrease the cost of innerliners which perform such an important function in the performance of a tire.

Acrylonitrile/butadiene copolymers are commonly known for having excellent air impermeability. Since acrylonitrile/butadiene copolymers are conventionally more economical than halobutyl rubbers, one would hope that such acrylonitrile/butadiene copolymers could be utilized as an innerliner. Unfortunately, acrylonitrile/butadiene copolymers suffer from unacceptable flexural properties at low temperatures. Since a rubber used in an innerliner must be flexible and the service life of a pneumatic tire commonly involves severe low temperatures, the use of an acrylonitrile/butadiene copolymer as an innerliner would be expected to meet with failure.

SUMMARY OF THE INVENTION

The present invention relates to a pneumatic tire having a multi-layered innerliner. Use of a top layer and a minimum of a 3 layered laminate, at least two barrier layers being made from an acrylonitrile/diene copolymer, results in significantly reducing the costs of the innerliner while maintaining the overall barrier and flexibility required for tire innerliner applications.

DETAILED DESCRIPTION OF THE INVENTION

There is disclosed a pneumatic rubber tire having an integral innerliner comprising a top layer on rubber laminate having at least 3 layers wherein (a) at least 2 of said three layers are barrier layers each comprised of a sulfur cured rubber composition containing, based on 100 parts by weight of rubber, 100 parts by weight of acrylonitrile/diene copolymer having an acrylonitrile content ranging from about 30 to 45% and from about 25 to about 150 parts by weight of a platy filler selected from the group consisting of talc, clay, mica or mixtures thereof; and (b) the thickness of each barrier layer containing 100 parts by weight of acrylonitrile/diene copolymer ranges from about 25 microns to 380 microns: and (c) between the 2 barrier layers of sulfur cured rubber containing 100 parts of acrylonitrile/diene copolymer is at least one nonbarrier layer of a sulfur cured rubber selected from the group consisting of natural rubber, halogenated butyl rubber, styrene/butadiene rubber, cis-1,4-polybutadiene, cis-1,4-polyisoprene, styrene/isoprene/butadiene rubber, butyl rubber or mixtures thereof.

The innerliner of the present invention is characterized by having a top layer and at least three layers of a sulfur cured rubber composition. Whereas three layers is the minimum, it is contemplated that one may have up to one-hundred layers since the major limitation is being able to produce and ply up each individual layer having a sufficiently low thickness offset by the total thickness of the innerliner. Preferably, the innerliner of the present invention comprises a top layer and a rubber laminate having from about 5 to about 12 layers of a sulfur cured rubber composition. Surprisingly, increasing the number of layers in the laminate (for a given thickness) decreases low temperature stiffness (measured by ASTM-1053-85). Increasing the number of layers also decreases low strain modulus at room temperature while increasing high strain modulus.

The rubber laminate which is used as an innerliner contains at least two barrier layers of a sulfur cured rubber composition each layer containing, based on 100 parts by weight of rubber (phr), 100 phr of acrylonitrile/diene copolymer having an acrylonitrile content ranging from about 30 to about 45 percent. The acrylonitrile/diene copolymers are intended to include acrylonitrile/butadiene and acrylonitrile isoprene copolymers. Preferably, the acrylonitrile/diene copolymer is an acrylonitrile/butadiene copolymer. The preferred acrylonitrile/diene copolymer has an acrylonitrile content ranging from about 32 to about 40 percent. With increasing levels of acrylonitrile, the air permeability of the acrylonitrile/diene rubber layer will increase. Unfortunately, with increasing levels of acrylonitrile content, there is a decrease in the flexural properties at frigid temperatures, i.e., below −35° C. The Mooney viscosity of the acrylonitrile-diene copolymer is not considered to be a limiting feature.

The acrylonitrile/diene copolymer compound may contain up to 150 phr of a platy filler. Preferably, the acrylonitrile/diene copolymer compound contains from about 20 to 150 phr of a platy filler. Representative of the platy fillers which may be used include talc, clay or mica. Preferably, talc is used. The amount of platy filler that is preferred will depend on the acrylonitrile/diene copolymer that is selected. For example, when using an acrylonitrile/diene copolymer having an acrylonitrile content of from about 30 to 35 percent, one may prefer to use the upper range with respect to the parts by weight of the platy filler. On the other hand, when one is using an acrylonitrile/diene copolymer having an acrylonitrile content above 40%, one may be able to use a lower amount of the platy filler.

The thickness of each acrylonitrile/diene copolymer barrier layer in the innerliner may vary depending on the number of layers in the laminate as well as the total thickness desired of the innerliner. Generally speaking, the thickness of each acrylonitrile/diene copolymer-containing barrier layer ranges from about 25 microns (1 mil) to about 380 microns (15 mils). Preferably, the thickness of each of these barrier layers range from about 100 microns (4 mils) to about 320 microns (12 mils).

Between the 2 barrier layers of sulfur cured rubber containing the 100 parts of acrylonitrile/diene copolymer is at least one layer (nonbarrier layer) of a conventional rubber used in pneumatic tires. Representative of such rubbers include natural rubber, halogenated butyl rubber, butyl rubber, cis-1,4-polyisoprene, styrene-butadiene rubber, cis-1,4-polybutadiene, styrene-isoprene-butadiene rubber or mixtures thereof. Preferably, the layer is composed of natural rubber, styrene-butadiene rubber or mixtures thereof.

The thickness of each non-barrier layer in the innerliner may vary depending on the number of layers in the laminate as well as the total thickness desired of the innerliner. Generally speaking, the thickness of each non-barrier layer may range from about 25 microns (1 mil) to about 1143 microns (45 mils). Preferably, the thickness of each non-barrier layer may range from about 100 microns (4 mils) to about 508 microns (20 mils).

While the innerliner may have various layers of different compounds, it is preferred to have the top layer (layer closest to the carcass of the tire) be a nonbarrier layer for compatibility reasons and especially if the abutting carcass rubber is the same rubber as the top layer of the innerliner.

The various rubber compositions which make up each layer of the innerliner, including layers containing the acrylonitrile/diene rubber, may be compounded with conventional rubber compounding ingredients. Conventional ingredients commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the sulfur vulcanized rubber, certain additives mentioned above are commonly used in conventional amounts. Typical additions of carbon black comprise from about 10 to 100 parts by weight of rubber (phr), preferably 50 to 70 phr. Typical amounts of tackifier resins comprise about 2 to 10 phr. Typical amounts of processing aids comprise about 1 to 5 phr. Typical amounts of antioxidant comprise 1 to 10 phr. Typical amounts of antiozonants comprise 1 to 10 phr. Typical amounts of stearic acid comprise 0.50 to about 2 phr. Typical amounts of zinc oxide comprise 1 to 5 phr. Typical amounts of waxes comprise 1 to 5 phr. Typical amounts of oils comprise 2 to 30 phr. Typical amounts of peptizers 0.1 to 1 phr. The presence and relative amounts of the above additives are not an aspect of the present invention.

The vulcanization of the composition for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. Preferably, the sulfur vulcanizing agent is elemental sulfur. As known to those skilled in the art, sulfur vulcanizing agents are used in amount ranging from about 0.2 to 8.0 phr with a range of from about 0.5 to 5.0 being preferred.

Accelerators are used to control the time and/or temperature required for vulcanization and to improve the properties of the vulcanizate. A single accelerator system may be used, i.e., primary accelerator in conventional amounts ranging from about 0.3 to 5.0 phr. In the alternative, combinations of 2 or more accelerators may be used which may consist of a primary accelerator which is generally used in the larger amount (0.3 to 5.0 phr), and a secondary accelerator which is generally used in smaller amounts (0.05-1.0 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not effected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. Preferably, the primary accelerator is a disulfide or sulfenamide. If a secondary accelerator is used, the secondary accelerator is preferably a guanidine, dithiocarbamate or thiuram compound.

In practice, the various rubber compositions are used to form a laminate. As known to those skilled in the art, the layers are produced by a press or passing a rubber composition through a mill, calender, multihead extruder or other suitable means. Preferably, the layers are produced by a calender because greater uniformity is believed to be provided. The layers are then assembled into a laminate. The uncured laminate is then constructed as an inner surface (exposed inside surface) of an uncured rubber tire structure, also known as the carcass. The innerliner is then sulfur cocured with the tire carcass during the tire curing operation under conditions of heat and pressure. Vulcanization of the tire containing the innerliner of the present invention is generally carried out at temperatures of between about 100° C. and 200° C. Preferably, the vulcanization is conducted at temperatures ranging from about 110° C. to 180° C. Any of the usual vulcanization processes may be used such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being cocured therewith as compared to being a simple adherent laminate. Typically, the innerliner of the present invention has an uncured gum thickness in the range of from about 0.04–0.4 centimeters. Preferably, the innerliner has an uncured gum thickness in the range of from about 0.08 to about 0.02 centimeters. As a cured innerliner, the laminate may have a thickness ranging from about 0.02 to about 0.35 centimeters. Preferably, the thickness will range from about 0.04 to about 0.15 cm thickness.

The pneumatic tire with the integral laminate innerliner may be constructed in the form of a passenger tire, truck tire, or other type of bias or radial pneumatic tire.

The following examples are presented in order to illustrate but not limit the present invention.

EXAMPLE 1

A series of laminates were prepared to illustrate the various aspects of the present invention. The nonbarrier compounds that were used included a (1) natural rubber (NR)/styrene butadiene rubber (Plioflex ® 1778) blend in a NR/SBR weight ratio of 70/30, and (2) a styrene butadiene rubber (Plioflex® 1502) as the sole rubber. Plioflex® 1502 is a styrene-butadiene rubber (23% styrene) that has a Mooney viscosity of 55 and is marketed by The Goodyear Tire & Rubber Company. The NBR's used as barrier compounds included Chemigum® RCG-4908 (NBR-43) having a 43% acrylonitrile content, Chemigum® N-328B (NBR-39) having a 39% acrylonitrile content, and Chemigum® N-628B (NBR-33) having a 33% acrylonitrile content. Chemigum® NBR is commercially available from The Goodyear Tire & Rubber Company. The mica used was a 150 mesh dry ground phlogopite mica. The talc used was an ultra fine high purity magnesium silicate. The carbon black used was an ASTM N-660 (GPF) black with a dibutyl phthalate number (DPB) of 93 $dm^3/kg$ and a nitrogen area of 34 $m^2/gm$.

The NR/SBR nonbarrier compounds contained conventional amounts of carbon black, processing oil, tackifiers, curatives, stearic acid, zinc oxide, and accelerators. 2.25 phr of sulfur was used. These ingredients were mixed in a Banbury mixer and sheeted out on a finishing mill.

The SBR nonbarrier compound was prepared as follows: 100 parts of SBR, 50 parts of mica, 30 parts of talc, and conventional amounts of carbon black, zinc oxide and stearic acid were charged into a #1 Banbury mixer and mixed for 5.5 minutes at 65 rpm. The rubber compound was discharged and sheeted out on a finish mill. After cooling, 1.70 parts of sulfur and conventional amounts of accelerators were added and mixed for 2 minutes. The rubber compound was then discharged and sheeted out on a rubber mill.

Filled barrier compounds were prepared according to the procedure used for the filled SBR nonbarrier compounds except for the various NBR's using 100 parts of NBR, 20 parts of talc, 1.7 parts of sulfur and conventional amounts of carbon black, zinc oxide, stearic acid, and accelerators.

Unfilled SBR compounds were prepared by charging 100 parts of SBR and conventional amounts of zinc oxide and stearic acid into a #1 Banbury mixer and mixing together for five minutes. The rubber compound was then discharged, sheeted out and cooled. The resulting rubber compound, along with conventional amounts of accelerators, were mixed in a #1 Banbury mixer by charging about half of the rubber preblend, mixing 30 seconds at 65 rpm, adding the balance of the ingredients followed by the remaining rubber preblend and mixing for another 3.5 minutes. The rubber compound was then discharged and sheeted out with a finish mill.

The unfilled NBR-43 gum compounds were prepared in the manner described for the unfilled SBR compound.

Calendered layers were prepared by preheating the rubber stock on a plastics mill and calendering it to form layers of the desired thickness using the bottom three rolls of an inverted L four-roll calender with roll temperatures held at 74°-77° C. and then rolling it up with a polyethylene backing. Lab pressed layers were prepared using a hydraulic press for five minutes with spacers of the desired layer thickness at 95° C. and 1400 kg.

Laminates were prepared by stacking four inch square layers of the desired thickness together with the outside layers being non-barrier layers.

The laminates were cured in a 0.089 cm thick four inch square mold for 20 minutes at 150° C. The laminates were placed in the mold as prepared.

Table I below lists the nonbarrier compound, barrier compound, type of filler (M=mica, T=talc and CB for carbon black), the construction (number of layers and thickness of each layer in mils with alternating layers of nonbarrier/barrier/nonbarrier order), the oxygen permeability for the total barrier layers used in the laminate, the oxygen permeability for the total non-barrier layers in the laminate, the oxygen permeability of the total laminate (barrier and non-barrier), tensile properties for each laminate, and Gehman moduli at −35° C. The Gehman test (ASTM-1053-85) measures a torsional modulus relative to a standard wire of known modulus at a series of temperatures. The strain involved is relatively low, not unlike the strains experienced by a tire carcass during normal use. The modulus of a material is a measure of stiffness. Since −35° C. is a temperature common to where tires may be used, the stiffness of the innerliner at this temperature is important. The lower the modulus of the sample (measured in psi), the more flexible it will be and less likely to crack as the tire rolls. Oxygen permeabilities were measured on a MoCon Oxytran 10/50 coulemetric instrument following ASTM D-3985-81.

TABLE I

| | | | | | | $O_2$ Permeability (cc/mil/100 $in^2$/Day) | | |
|---|---|---|---|---|---|---|---|---|
| Sample | Non-Barrier Compound | Non-Barrier Filler | Barrier Compound | Barrier Filler | Construction (mils) | Barrier Alone | Non Barrier Alone | Laminate |
| 1 (c) | NR/SBR | CB | NBR-43 | T-CB | 15/14/16 | 71 | 2992 | 242 |
| 2 (c) | NR/SBR | CB | NBR-43 | T-CB | 7.5/7.5/7.5/7.5/7.5 | 71 | 2992 | 214 |
| 3 (c) | NR/SBR | CB | NBR-43 | T-CB | 7/7/6/7/7 | 71 | 2992 | 547 |
| 4 (c) | NR/SBR | CB | NBR-39 | T-CB | 4/8/8/8/8/8/4 | 94 | 2992 | 187 |
| 5 (c) | NR/SBR | CB | NBR-33 | T-CB | 4/6/8/6/6/4 | 279 | 2992 | 586 |
| 6 (p) | SBR | No | NBR-43 | T-CB | 15/15/15 | 71 | 2098 | 193 |
| 7 (p) | SBR | No | NBR-43 | No | 15/15/15 | 106 | 2098 | 229 |
| 8 (p) | SBR | No | NBR-43 | No | 15/15/15 | 106 | 2098 | 283 |
| 9 (p) | SBR | No | NBR-43 | No | 15/15/15 | 106 | 2098 | 366 |
| 10 (p) | SBR | No | NBR-43 | No | 8/8/8/8/8 | 106 | 2098 | 250 |
| 11 (c) | SBR | T-M-CB | NBR-43 | T-CB | 12/7.5/12/7.5/12 | 71 | 583 | 183 |
| 12 (c) | SBR | T-M-CB | NBR-43 | T-CB | 16/14/17 | 71 | 583 | 195 |
| 13 (p) | SBR | T-M-CB | NBR-43 | T-CB | 15/15/15 | 71 | 583 | 179 |
| 14 (p) | SBR | T-M-CB | NBR-43 | T-CB | 15/15/15 | 71 | 583 | 243 |
| 15 (p) | SBR | T-M-CB | NBR-43 | T-CB | 15/15/15 | 71 | 583 | 124 |
| 16 (p) | SBR | T-M-CB | NBR-43 | T-CB | 8/8/8/8/8 | 71 | 583 | 126 |
| 17 (p) | SBR | T-M-CB | NBR-43 | T-CB | 8/8/8/8/8 | 71 | 583 | 112 |
| 18 (c) | SBR | T-M-CB | NBR-43 | T-CB | 7/7/7/7/7 | 71 | 583 | 152 |
| 19 (p) | SBR | T-M-CB | NBR-43 | No | 15/15/15 | 106 | 583 | 322 |
| 20 (c) | SBR | T-M-CB | NBR-39 | T-CB | 4/7/4/15/4/7/4 | 94 | 583 | 234 |

TABLE I-continued

Laminates

| Sample | Non-Barrier Compound | Non-Barrier Filler | Barrier Compound | Barrier Filler | Construction (mils) | | | |
|---|---|---|---|---|---|---|---|---|
| 21 (c) | SBR | T-M-CB | NBR-39 | T-CB | 17/19/17 | 94 | 583 | 225 |
| 22 (c) | SBR | T-M-CB | NBR-39 | T-CB | 4/6/4 - 17 layers | 94 | 583 |  |
| 23 (c) | SBR | T-M-CB | NBR-33 | T-CB | 4/6/4/15/4/6/4 | 279 | 583 | 587 |
| 24 (c) | SBR | T-M-CB | NBR-33 | T-CB | 16/16/16.5 | 279 | 583 | 430 |
| 25 (c) | SBR | T-M-CB | NBR-33 | T-CB | 4/6/4/6/4/6/4 | 279 | 583 | 362 |

| Sample | Non-Barrier Compound | Non-Barrier Filler | Barrier Compound | Barrier Filler | Construction (mils) | Tensile (psi) Break | % Elong | 10% | 300% | Gehman Moduli −35° C. (psi) |
|---|---|---|---|---|---|---|---|---|---|---|
| 1 (c) | NR/SBR | CB | NBR-43 | T-CB | 15/14/16 | 2743 | 434 | 106 | 1652 | 15660 |
| 2 (c) | NR/SBR | CB | NBR-43 | T-CB | 7.5/7.5/7.5/7.5/7.5 | 2802 | 450 | 110 | 1592 | 11410 |
| 3 (c) | NR/SBR | CB | NBR-43 | T-CB | 7/7/6/7/7 | 2552 | 394 | 90 | 1788 | 11400 |
| 4 (c) | NR/SBR | CB | NBR-39 | T-CB | 4/8/8/8/8/4 | 3212 | 450 | 126 | 1696 | 15260 |
| 5 (c) | NR/SBR | CB | NBR-33 | T-CB | 4/6/8/6/8/6/4 | 2013 | 382 | 96 | 1337 | 13640 |
| 6 (p) | SBR | No | NBR-43 | T-CB | 15/15/15 | 1057 | 326 | 101 | 907 |  |
| 7 (p) | SBR | No | NBR-43 | No | 15/15/15 | 616 | 373 | 67 | 476 |  |
| 8 (p) | SBR | No | NBR-43 | No | 15/15/15 | 670 | 407 | 64 | 395 |  |
| 9 (p) | SBR | No | NBR-43 | No | 15/15/15 | 640 | 271 | 66 |  | 15910 |
| 10 (p) | SBR | No | NBR-43 | No | 8/8/8/8/8 | 707 | 412 | 66 | 396 |  |
| 11 (c) | SBR | T-M-CB | NBR-43 | T-CB | 12/7.5/12/7.5/12 | 1263 | 408 | 169 | 810 | 13640 |
| 12 (c) | SBR | T-M-CB | NBR-43 | T-CB | 16/14/17 | 1314 | 419 | 193 | 840 | 20090 |
| 13 (p) | SBR | T-M-CB | NBR-43 | T-CB | 15/15/15 | 1335 | 387 | 190 | 902 |  |
| 14 (p) | SBR | T-M-CB | NBR-43 | T-CB | 15/15/15 | 1079 | 421 | 192 | 784 | 69840 |
| 15 (p) | SBR | T-M-CB | NBR-43 | T-CB | 15/15/15 | 1334 | 368 | 184 | 998 | 22080 |
| 16 (p) | SBR | T-M-CB | NBR-43 | T-CB | 8/8/8/8/8 | 2039 | 456 | 170 | 985 | 103100 |
| 17 (p) | SBR | T-M-CB | NBR-43 | T-CB | 8/8/8/8/8 | 1730 | 413 | 180 | 1081 | 66490 |
| 18 (p) | SBR | T-M-CB | NBR-43 | T-CB | 7/7/7/7/7 | 1592 | 446 | 174 | 837 | 118130 |
| 19 (p) | SBR | T-M-CB | NBR-43 | No | 15/15/15 | 964 | 405 | 170 | 606 |  |
| 20 (c) | SBR | T-M-CB | NBR-39 | T-CB | 4/7/4/15/4/7/4 | 2491 | 403 | 118 | 1575 | 10340 |
| 21 (c) | SBR | T-M-CB | NBR-39 | T-CB | 17/19/17 | 1137 | 351 | 184 | 915 | 20700 |
| 22 (c) | SBR | T-M-CB | NBR-39 | T-CB | 4/6/4 - 17 layers | 1432 | 491 | 134 | 691 |  |
| 23 (c) | SBR | T-M-CB | NBR-33 | T-CB | 4/6/4/15/4/6/4 | 1749 | 353 | 97 | 1358 | 13640 |
| 24 (c) | SBR | T-M-CB | NBR-33 | T-CB | 16/16/16.5 | 879 | 333 | 159 | 769 | 24050 |
| 25 (c) | SBR | T-M-CB | NBR-33 | T-CB | 4/6/4/6/4/6/4 | 1529 | 461 | 135 | 796 |  |

(c) = Calendered layers
(p) = Pressed layers

Sample 1 is an example of a laminate using a high acrylonitrile NBR for a barrier layer sandwiched between two nonbarrier layers. A laminate would normally be doubled for commercial use as an innerliner covered by this invention. The non-barrier layers may be expected to provide excellent adhesion to the tire carcass.

The Sample 12 laminate is similar to that of Sample 1 except for the change in non-barrier material to an SBR with mica filler and talc. This non-barrier material has an oxygen permeability of 583 cc/mil/100 in.$^2$/Day versus 2992 measured for the non-barrier formulation used in Sample 1. In spite of this large difference, the two laminates have essentially the same oxygen permeability. The difference in non-barrier material is apparent, however, in the lower ultimate tensile properties for the laminate of Sample 12.

The laminates of Samples 21 and 24 differ from Example 12 primarily by the acrylonitrile content of the NBR elastomer used in the barrier formulation. The effect of acrylonitrile content on permeability is obvious. The permeability of the laminate in Sample 12 was 195 cc/mil/100/in.$^2$/Day. Decreasing the acrylonitrile content from 43% to 39% for the barrier resin used in the laminate from Sample 21 results in the permeability 225. With a barrier resin acrylonitrile content of 33%, the laminate in Sample 24 shows a sharp increase in permeability to 430.

Sample 20 presents a laminate similar in composition to the laminate from Sample 21, but with substantially thinner barrier layers. The effect on permeability is minimal, but the effect on the physical properties is substantial. The Gehman moduli at −35° C. for the laminate in Sample 20 is substantially lower than observed for the laminate for Sample 21. At room temperature the ultimate tensile strength, elongation and 300% modulus are considerably higher for the laminate in Sample 20, while the 10% modulus is higher for the laminate from Sample 21.

Sample 14 illustrates the effect of a second method of layer preparation. As is evident from the data presented in Table I, preparing layers using a hydraulic press in the manner described results in minimal change in properties.

Sample 19 is similar to Sample 14 except that no filler was incorporated into the barrier layer. This results in a substantial increase in permeability, illustrating the importance of filler in the barrier layer to the barrier properties of the laminate.

EXAMPLE 2

The following samples were prepared to further demonstrate the breadth of the present invention. The non-barrier rubbers that were used included (1) a natural rubber (NR)/styrene-butadiene rubber (Plioflex ® 1778) blend in a NR/SBR weight ratio of 70/30 and (2) a styrene butadiene rubber (Plioflex ® 1507) as the sole rubber. Plioflex ® 1507 is a styrene butadiene rubber (23% styrene) and is marketed by The Goodyear Tire & Rubber Company. The NBR's used as barrier materials included Chemigum ® N300 (NBR-39) having a 39% acrylonitrile content and Chemigum ® N624 (NBR-33) having a 33% acrylonitrile content. The mica and talc were the same as used in Example 1.

The NR/SBR nonbarrier compounds were processed and contained the same ingredients and in the same amounts as used in Example 1.

The SBR nonbarrier compound was prepared as follows: 100 parts of SBR, 105.25 parts of talc and conventional amounts of zinc oxide and stearic acid were charged into a #1 Banbury mixer and mixed for 5.5 minutes at 65 rpm. The rubber compound was discharged and sheeted out on a finish mill. After cooling 1.1 parts of sulfur and conventional amounts of accelerators were added and mixed for 2 minutes. The rubber compound was then discharged and sheeted out on a rubber mill.

A talc filled NBR-39 compound was prepared according to the procedure used for the filled SBR nonbarrier compound except 100 parts of NBR-39 and 52.47 parts of talc were used. The same amount of sulfur, zinc oxide, stearic acid and accelerators as used.

A talc filled NBR-33 compound was prepared according to the procedure used for the filled SBR nonbarrier compound except 100 parts of NBR-33 and 75.8 parts of talc were used. The same amount of sulfur, zinc oxide, stearic acid and accelerators was used.

Table II below lists the nonbarrier comopund, barrier compound, type of filler (M=mica, CB=carbon black or T=talc), the construction and the oxygen permeability for the total laminate.

TABLE II

| | | | Laminates[1] | | | |
|---|---|---|---|---|---|---|
| Sample | Non-Barrier Compound | Non-Barrier Filler | Barrier Compound | Barrier Filler | Construction (mils) | $O_2$ Permeability Laminate cc/mil/100 sq" D |
| 26 | SBR | T | NBR-33 | T | 9/8/9/8/9 | 352 |
| 27 | SBR | T | NBR-33 | M | 10/7/10/7/10 | 350 |
| 28 | SBR | T | NBR-39 | T | 9/7/9/7/10 | 250 |
| 29 | NR/SBR | CB | NBR-33 | T | 7/9/8/9/8 | 244 |
| 30 | NR/SBR | CB | NBR-33 | M | 15/15/15 | 353 |
| 31 | NR/SBR | CB | NBR-39 | T | 15/13/15 | 232 |

[1]All laminates were calendered and were constructed in the order of non-barrier/barrier/non-barrier layers.

What is claimed is:

1. A pneumatic rubber tire having an integral innerliner comprising a top layer and a rubber laminate having at least 3 additional layers wherein said top layer is closed to the carcass of the tire and is comprised of a sulfur cured rubber consisting of natural rubber, styrene-butadiene rubber blends thereof and
   (a) at least 2 of said 3 layers are barrier layers each comprised of a sulfur cured rubber composition containing, based on 100 parts by weight of rubber, 100 parts by weight of acrylonitrile/diene copolymer having an acrylonitrile content ranging from about 30 to 45% and form about 25 to about 150 parts by weight of a platy filler selected from the group consisting of talc, clay, mica or mixtures thereof; and
   (b) the thickness of each barrier layer containing 100 parts by weight of acrylonitrile/diene copolymer ranges from about 25 microns to 380 microns; and
   (c) between the 2 barrier layers of sulfur cured rubber containing 100 parts of acrylonitrile/diene copolymer is at least one nonbarrier layer of a sulfur cured rubber selected form the group consisting of natural rubber, halogenated butyl rubber, cis-1,4-polybutadiene, styrene/butadiene rubber, cis-1,4-polyisoprene, styrene/isoprene/butadiene rubber, butyl rubber or mixtures thereof.

2. The pneumatic tire of claim 1 wherein said innerliner consists of 3 to 100 layers.

3. The pneumatic tire of claim 1 wherein the platy filler is talc.

4. The pneumatic tire of claim 1 wherein the thickness of each of the barrier layers containing 100 parts by weight of acrylonitrile/diene copolymer ranges from about 100 microns to about 320 microns.

5. The pneumatic tire of claim 1 wherein said acrylonitrile/diene copolymer is an acrylonitrile/butadiene rubber.

6. The pneumatic tire of claim 6 wherein said acrylonitrile/butadiene rubber has an acrylonitrile content ranging from about 32% to about 40%.

7. The pneumatic tire of claim 1 wherein said innerliner consists of from 5 to 12 layers.

8. The pneumatic tire of claim 1 wherein the thickness of said nonbarrier layer ranges from about 25 microns to about 1143 microns.

9. The pneumatic tire of claim 1 wherein said integral innerliner as a cured innerliner has a total thickness of from about 0.02 to about 0.35 centimeters.

10. The pneumatic tire of claim 1 wherein said nonbarrier layer of sulfur cured rubber has a thickness ranging from about 100 to about 508 microns.

* * * * *